(12) United States Patent
Rieken (10) Patent No.: US 11,454,219 B2
(45) Date of Patent: Sep. 27, 2022

(54) ROTOR ASSEMBLY HAVING A PITCH BEARING WITH A STIFFENER RING

(71) Applicant: General Electric Company, Schenectady, NY (US)

(72) Inventor: Stefan Rieken, Lathen (DE)

(73) Assignee: General Electric Company, Schenectady, NY (US)

( * ) Notice: Subject to any disclaimer, the term of this patent is extended or adjusted under 35 U.S.C. 154(b) by 556 days.

(21) Appl. No.: 16/408,883

(22) Filed: May 10, 2019

(65) Prior Publication Data

US 2020/0355165 A1 Nov. 12, 2020

(51) Int. Cl.
*F03D 80/70* (2016.01)
*F03D 7/02* (2006.01)
*F16C 19/28* (2006.01)
*F16C 33/58* (2006.01)

(52) U.S. Cl.
CPC ........... *F03D 80/70* (2016.05); *F03D 7/0224* (2013.01); *F16C 19/28* (2013.01); *F16C 33/586* (2013.01); *F05B 2260/79* (2013.01); *F16C 2300/14* (2013.01); *F16C 2360/31* (2013.01)

(58) Field of Classification Search
CPC ........ F03D 80/70; F03D 7/0224; F16C 19/28; F16C 33/586
See application file for complete search history.

(56) References Cited

U.S. PATENT DOCUMENTS

| 678,326 | A | 7/1901 | Wittke |
| 6,942,461 | B2 | 9/2005 | Wobben |
| 7,780,417 | B2 | 8/2010 | Kirchner et al. |
| 7,874,800 | B2 | 1/2011 | Kirchner et al. |
| 8,047,792 | B2 | 11/2011 | Bech et al. |
| 8,297,929 | B2 | 10/2012 | Steffensen |
| 8,322,928 | B2 | 12/2012 | Larsen et al. |
| 8,628,301 | B2 | 1/2014 | Pasquet |
| 9,181,982 | B2 | 11/2015 | Lindholst et al. |
| 9,206,743 | B2 | 12/2015 | Schnetgoke |

(Continued)

FOREIGN PATENT DOCUMENTS

| AU | 2003206727 A1 | 7/2003 |
| CN | 202108665 U | 1/2012 |

(Continued)

OTHER PUBLICATIONS

European Search Report, dated Oct. 1, 2020, for EP Application No. 20172167.7.

*Primary Examiner* — Courtney D Heinle
*Assistant Examiner* — Sang K Kim
(74) *Attorney, Agent, or Firm* — Dority & Manning, P.A.

(57) ABSTRACT

A rotor assembly for a wind turbine includes a rotor blade extending between a blade root and a blade tip, a rotatable hub, a pitch bearing arranged between the rotor blade and a hub of the wind turbine, and a stiffener ring. The pitch bearing has an outer race, an inner race rotatable relative to the outer race, and a plurality of roller elements arranged between the outer race and the inner race. The stiffener ring is arranged between one of the inner race or the outer race of the pitch bearing and the blade root. Further, the stiffener ring has a symmetrical shape so as to provide uniform stiffness to the pitch bearing so as to provide a uniform stiffness to the pitch bearing.

14 Claims, 9 Drawing Sheets

(56) References Cited

U.S. PATENT DOCUMENTS

| | | | |
|---|---|---|---|
| 9,261,071 | B2 | 2/2016 | Andersen et al. |
| 9,273,732 | B2 | 3/2016 | Ebbesen et al. |
| 9,551,324 | B2 | 1/2017 | Minadeo |
| 9,587,623 | B2 | 3/2017 | Christoffersen et al. |
| 9,739,258 | B2 | 8/2017 | Bitsch et al. |
| 9,915,245 | B2 | 3/2018 | Kosuri et al. |
| 10,018,178 | B2 * | 7/2018 | Fernandez Falces ........................ F03D 7/0224 |
| 10,844,833 | B2 * | 11/2020 | Trede .................... F03D 1/0658 |
| 2003/0116970 | A1 | 6/2003 | Weitkamp et al. |
| 2008/0104821 | A1 | 5/2008 | Erill et al. |
| 2008/0191488 | A1 | 8/2008 | Kirchner et al. |
| 2008/0193295 | A1 | 8/2008 | Kirchner et al. |
| 2008/0199315 | A1 | 8/2008 | Bech |
| 2008/0213095 | A1 | 9/2008 | Bech et al. |
| 2009/0016665 | A1 | 1/2009 | Yoshida et al. |
| 2009/0016885 | A1 | 1/2009 | Bech |
| 2009/0022442 | A1 | 1/2009 | Bech et al. |
| 2009/0087127 | A1 * | 4/2009 | Larsen .................. F03D 7/0224 384/129 |
| 2009/0311104 | A1 * | 12/2009 | Steffensen ............ F03D 1/0658 416/204 R |
| 2009/0317256 | A1 | 12/2009 | Quell |
| 2010/0098552 | A1 | 4/2010 | Aarhus |
| 2010/0296927 | A1 | 11/2010 | Siniscalchi |
| 2011/0142618 | A1 | 6/2011 | Moore |
| 2011/0142645 | A1 | 6/2011 | Nunez Polo et al. |
| 2012/0183703 | A1 | 7/2012 | Beaulieu |
| 2012/0258834 | A1 * | 10/2012 | Winiasz .................. F03D 15/00 475/159 |
| 2012/0263598 | A1 | 10/2012 | Thomsen et al. |
| 2012/0328443 | A1 | 12/2012 | Yegro Segovia et al. |
| 2013/0058784 | A1 | 3/2013 | Sorensen |
| 2013/0136602 | A1 | 5/2013 | Pasquet |
| 2013/0172145 | A1 * | 7/2013 | Mourani .................. F03D 1/025 475/221 |
| 2013/0177419 | A1 | 7/2013 | Zaehr |
| 2013/0309069 | A1 | 11/2013 | Pandya |
| 2014/0064971 | A1 | 3/2014 | Sivanantham et al. |
| 2014/0161614 | A1 | 6/2014 | Vervoon et al. |
| 2014/0301847 | A1 * | 10/2014 | Neubauer ............. F03D 1/0691 416/147 |
| 2014/0302957 | A1 * | 10/2014 | Boing .................. H02K 7/1838 475/31 |
| 2014/0377069 | A1 * | 12/2014 | Minadeo ............... F16C 33/586 416/135 |
| 2015/0050152 | A1 | 2/2015 | Ebbesen |
| 2015/0056078 | A1 | 2/2015 | Pathuvoth |
| 2015/0176567 | A1 | 6/2015 | Fernandez Falces et al. |
| 2015/0300322 | A1 * | 10/2015 | Kosuri .................. F03D 7/0224 416/174 |
| 2016/0312766 | A1 | 10/2016 | Rasmussen |
| 2016/0341176 | A1 | 11/2016 | Shaik |
| 2017/0067441 | A1 | 3/2017 | Bech et al. |
| 2018/0320655 | A1 | 11/2018 | Zhou |
| 2020/0149515 | A1 * | 5/2020 | Buch-Lorentsen ..... F16C 33/58 |

FOREIGN PATENT DOCUMENTS

| | | |
|---|---|---|
| CN | 202326046 U | 7/2012 |
| CN | 102748222 A | 10/2012 |
| CN | 104533728 A | 4/2015 |
| CN | 204283729 U | 4/2015 |
| CN | 104595107 A | 5/2015 |
| CN | 204357640 U | 5/2015 |
| CN | 103184977 B | 11/2015 |
| CN | 205135896 U | 4/2016 |
| CN | 205225591 U | 5/2016 |
| CN | 205937003 U | 2/2017 |
| CN | 106594065 A | 4/2017 |
| CN | 206770136 U | 12/2017 |
| CN | 206972449 U | 2/2018 |
| EP | 2546512 A1 | 1/2013 |
| EP | 2933476 A1 | 10/2015 |
| EP | 2570655 B1 | 11/2015 |
| EP | 2463522 B1 | 3/2016 |
| FR | 2887934 B1 | 12/2010 |
| GB | 2494924 B | 8/2014 |
| JP | 4533642 B2 | 9/2010 |
| JP | 5543314 B2 | 7/2014 |
| KR | 101345711 B1 | 12/2013 |
| KR | 101345714 B1 | 12/2013 |
| KR | 101531265 B1 | 6/2015 |
| KR | 101571312 B1 | 11/2015 |
| WO | WO 2013/107452 A1 | 7/2013 |

* cited by examiner

ROTOR ASSEMBLY HAVING A PITCH BEARING WITH A STIFFENER RING

FIELD

The present disclosure relates generally to wind turbines and, more particularly, to a rotor assembly for a wind turbine having one or more pitch bearings with a stiffener ring for providing uniform stiffness thereto.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally understood, the loading on a rotor blade is a function of blade length, along with wind speed and turbine operating states. Thus, longer rotor blades may be subject to increased loading, particularly when a wind turbine is operating in high-speed wind conditions.

During the operation of a wind turbine, the loads acting on a rotor blade are transmitted through the blade and into the blade root. Thereafter, the loads are transmitted through a pitch bearing disposed at the interface between the rotor blade and the wind turbine hub. Typically, the hub has a much higher stiffness than the rotor blades. Thus, due to the stiffness differential between the hub and the rotor blades, the pitch bearings are often subjected to extreme, varying and/or opposing loads. For example, the inner race of each pitch bearing (i.e., the portion typically coupled to the rotor blades) may be subjected to varying, localized loads resulting from flapwise or edgewise bending of the rotor blades, whereas the outer race of each pitch bearing (i.e., the portion typically coupled to the hub) may be subjected to lower and/or differing loads. This variation in loading across the inner and outer races can result in substantial damage and/or deformation to the pitch bearings caused by high thrust levels, high bearing contact stresses, high blade root resultant moments, and hard pressure spots.

Accordingly, an improved rotor assembly for a wind turbine having a pitch bearing with a stiffener ring for reducing stress levels would be advantageous.

BRIEF DESCRIPTION

Aspects and advantages of the invention will be set forth in part in the following description, or may be obvious from the description, or may be learned through practice of the invention.

In one aspect, the present disclosure is directed to a rotor assembly for a wind turbine. The rotor assembly includes a rotor blade extending between a blade root and a blade tip, a rotatable hub, a pitch bearing arranged between the rotor blade and a hub of the wind turbine, and a stiffener ring. The pitch bearing has an outer race, an inner race rotatable relative to the outer race, and a plurality of roller elements arranged between the outer race and the inner race. The stiffener ring is arranged between one of the inner race or the outer race of the pitch bearing and the blade root. Further, the stiffener ring has a symmetrical shape so as to provide uniform stiffness to the pitch bearing.

In one embodiment, the inner race may be coupled to the blade root of the rotor blade and the outer race is coupled to a hub of the wind turbine. In another embodiment, the stiffener ring may be coupled between the inner race of the pitch bearing and the blade root of the rotor blade.

In another embodiment, the stiffener ring may be coupled between the inner race of the pitch bearing and the blade root of the rotor blade via a plurality of root bolts or a press fit. In further embodiments, the stiffener ring may extend radially inward of the inner race of the pitch bearing.

In an embodiment, the stiffener ring may define an outer diameter and an inner diameter. In such embodiments, the outer diameter of the stiffener ring may be equal to or less than an outer diameter of the inner race, whereas the inner diameter of the stiffener ring may be less than an inner diameter of the inner race of the pitch bearing. In an embodiment, the inner diameter may define a central opening of the stiffener ring.

In several embodiments, the stiffener ring may further include a first circumferential flange positioned at and circumferentially surrounding the central opening. In particular embodiments, the first circumferential flange may extend toward the blade tip of the rotor blade.

In an embodiment, the stiffener ring may include a second circumferential flange positioned at and circumferentially surrounding the outer diameter of the stiffener ring. In yet another embodiment, the stiffener ring may also include at least one stiffening rib at a radial position between the outer and inner diameters of the stiffener ring.

In an embodiment, the central opening may include a removable cover that forms a bulkhead. In another embodiment, the removable cover may be constructed of a plurality of segments.

In another aspect, the present disclosure is directed to a wind turbine. The wind turbine includes a tower, a nacelle mounted atop the tower, and a rotor mounted to the nacelle. The rotor includes a rotatable hub having a plurality of rotor blades secured thereto. Each of the rotor blades extends between a blade root and a blade tip. The wind turbine also includes a pitch bearing arranged between each of the plurality of rotor blades and the rotatable hub. Each of the pitch bearings includes an outer race, an inner race rotatable relative to the outer race, and a plurality of roller elements arranged between the outer race and the inner race. The wind turbine also includes a stiffener ring arranged between each of the pitch bearings and each of the blade roots of the rotor blades. Further, each of the stiffener rings comprises a symmetrical shape so as to provide a uniform stiffness to the pitch bearing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a rotor assembly for a wind turbine having a rotor blade, a pitch bearing, and a stiffener ring attached between the pitch bearing and the rotor blade. Further, the stiffener ring has a uniform geometry that provides stiffness to the inner and/or outer races uniformly, thereby enabling reduced stress levels and reduced deformation at the bearing ring. As such, the stiffener ring also enables the bearing roller elements to provide the required load path and loading under extreme wind turbine operational circumstances. Further, the stiffener ring enables service personnel to enter the rotor blade from the hub, but also enables a bulkhead function to the rotor blade.

Figure 1:
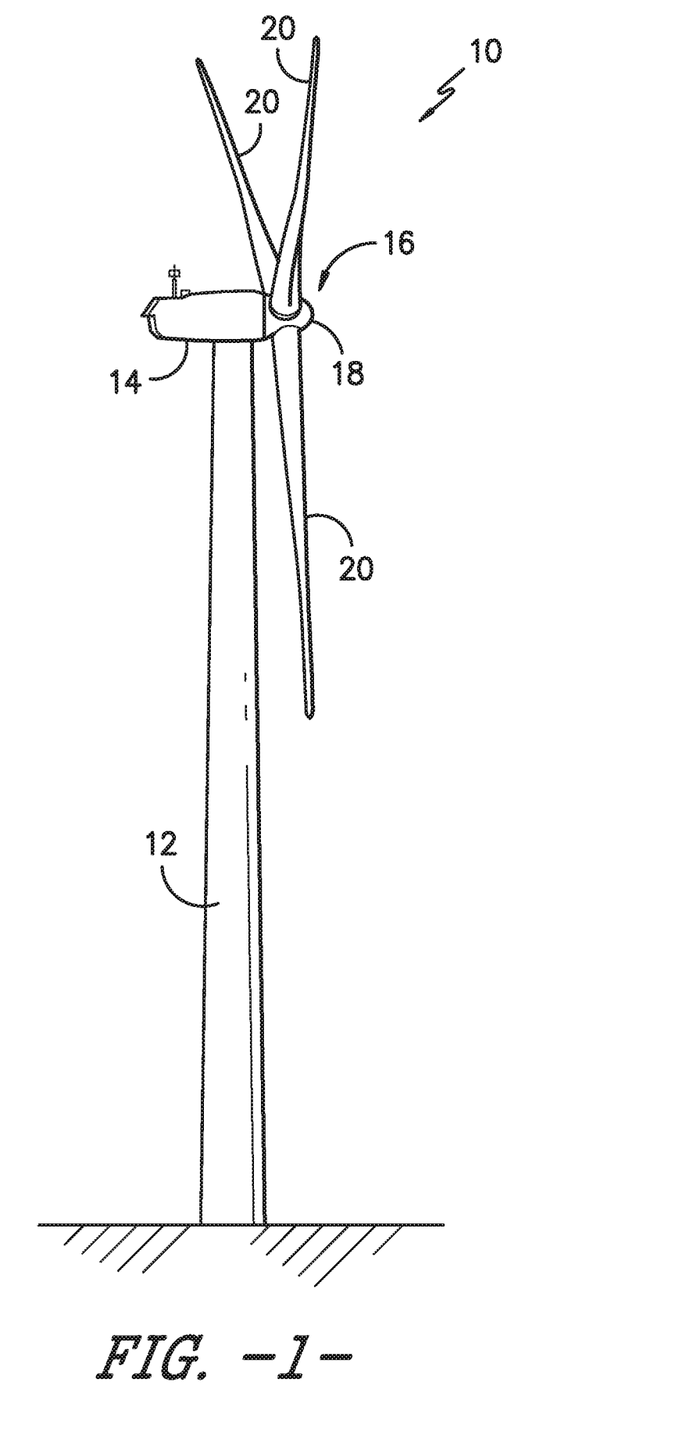
FIG. 1 illustrates a perspective view of one embodiment of a wind turbine according to the present disclosure.

Referring now to the drawings, FIG. 1 illustrates a side view of one embodiment of a wind turbine 10 according to the present disclosure. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator (not shown) positioned within the nacelle 14 to permit electrical energy to be produced.

Figure 2:
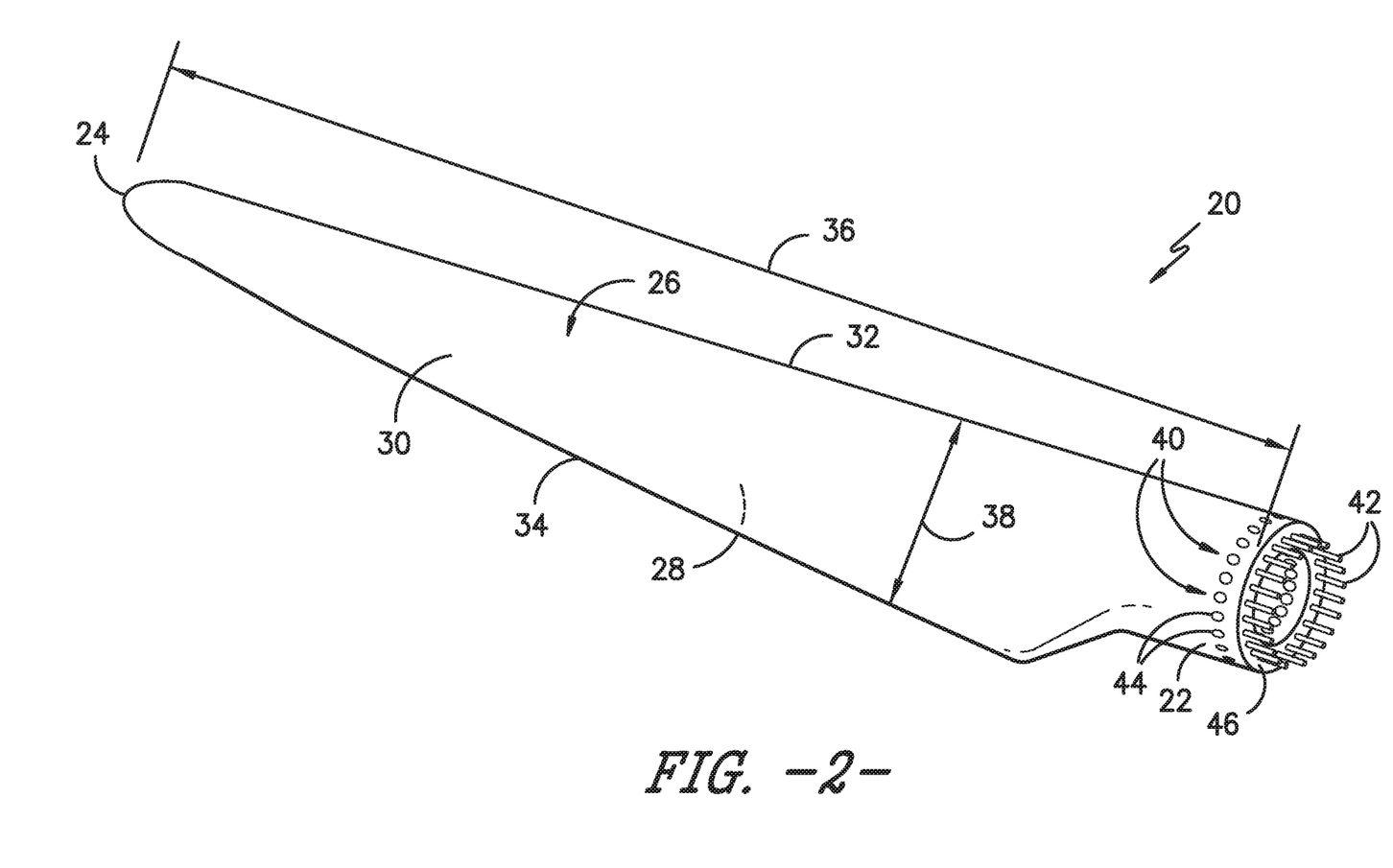
FIG. 2 illustrates a perspective view of one of the rotor blades of the wind turbine shown in FIG. 1.

Referring now to FIG. 2, a perspective view of one of the rotor blades 20 shown in FIG. 1 is illustrated in accordance with aspects of the present disclosure. As shown, the rotor blade 20 includes a blade root 22 configured for mounting the rotor blade 20 to the hub 18 of the wind turbine 10 (FIG. 1) and a blade tip 24 disposed opposite the blade root 22. A body 26 of the rotor blade 20 may extend lengthwise between the blade root 22 and the blade tip 24 and may generally serve as the outer shell of the rotor blade 20. As is generally understood, the body 26 may define an aerodynamic profile (e.g., by defining an airfoil shaped cross-section, such as a symmetrical or cambered airfoil-shaped cross-section) to enable the rotor blade 20 to capture kinetic energy from the wind using known aerodynamic principles. Thus, the body 26 may generally include a pressure side 28 and a suction side 30 extending between a leading edge 32 and a trailing edge 34. Additionally, the rotor blade 20 may have a span 36 defining the total length of the body 26 between the blade root 22 and the blade tip 24 and a chord 38 defining the total length of the body 26 between the leading edge 32 and the trailing edge 34. As is generally understood, the chord 38 may vary in length with respect to the span 26 as the body 26 extends from the blade root 22 to the blade tip 24.

Moreover, as shown, the rotor blade 20 may also include a plurality of T-bolts or root attachment assemblies 40 for coupling the blade root 20 to the hub 18 of the wind turbine 10. In general, each root attachment assembly 40 may include a barrel nut 44 mounted within a portion of the blade root 22 and a root bolt 42 coupled to and extending from the barrel nut 44 so as to project outwardly from a root end 46 of the blade root 22. Alternatively, the barrel nut 44 may be eliminated from the root attachment assembly 40. For example, each of the root attachment assemblies 40 may simply include a threaded root bolt 42 projecting outwardly from the root end 46 of the blade root 22. By projecting outwardly from the root end 46, the root bolts 42 may generally be used to couple the blade root 22 to the hub 18 (e.g., via a pitch bearing 52 (see e.g., FIG. 5)), as will be described in greater detail below.

Figure 3:
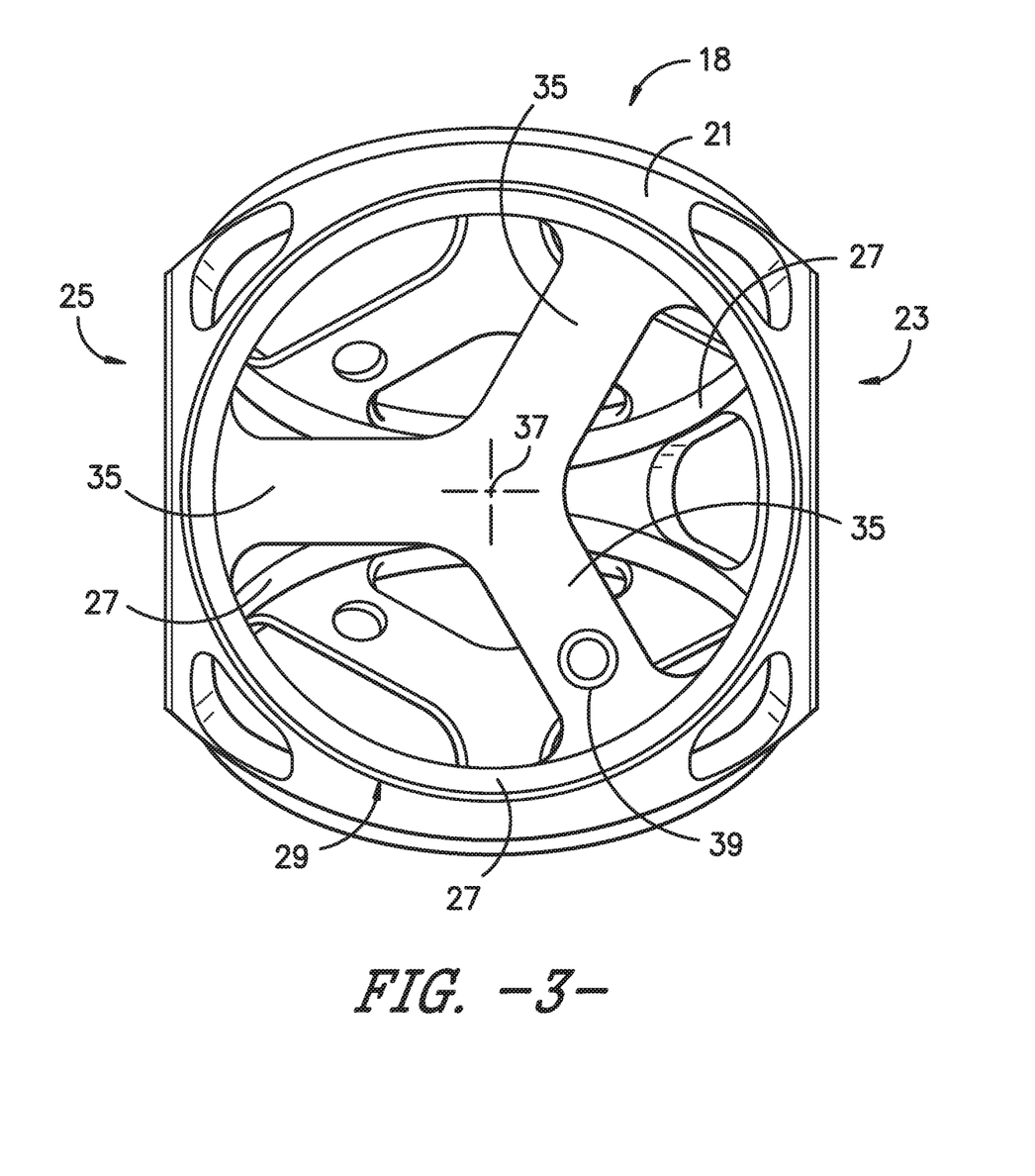
FIG. 3 illustrates a cross-sectional view of one embodiment of the hub of the wind turbine in accordance with aspects of the present disclosure.

Referring now to FIG. 3, a perspective view of one embodiment of the hub 18 of FIG. 1 is illustrated. As shown, the hub 18 has a hollow body 21 made of a suitable cast material which is basically known to persons skilled in the art. Other materials providing the required rigidity can also be used. The hollow body 21 may include a first end 23 and a second end 25 wherein the hollow shaft (not shown) of the wind turbine 10 is mounted to the first end 23 of the hollow body 21.

Further, as shown, a plurality of flanges 27 may be arranged at the outside of the hollow body 21, with the flanges 27 being displaced by about 120°. Moreover, each flange 27 may define a flange area 29 or opening within the respective flange 27 and extending in a plane. Thus, as shown, within each flange area 29 or opening, the hub 18 may include one or more stiffening webs 35 integrally formed with the wall of the hollow body 21 of the hub 18 and extending from the flange 27 radially inwardly to the center 37 of the flange area 29. In addition, as shown, the stiffening webs 35 may be integrally connected to each other. Alternatively, it should be understood that the stiffening webs 35 may be separated attached to the hub 18 rather than being integral with the hub 18.

Figure 4:
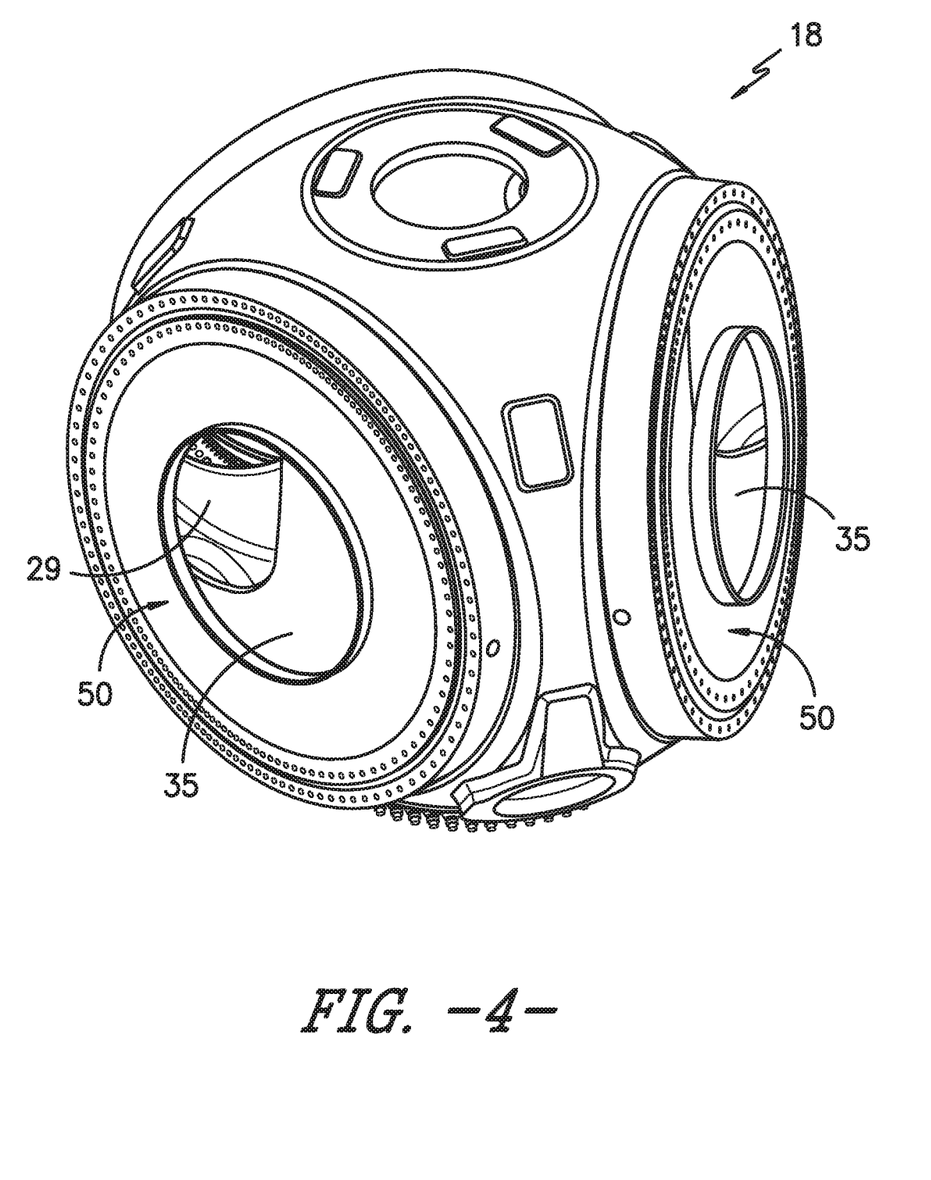
FIG. 4 illustrates a perspective view of one embodiment of the hub with one of the stiffener rings arranged at each of the openings of the hub according to the present disclosure, with the rotor blades removed to illustrate details thereof.

In additional embodiments, as shown in FIG. 4, the portions of each of the plurality of openings 29 that remain open may be at least partially aligned with the central openings 55 of the stiffener rings 50 described herein. Thus, by aligning the holes, personnel can enter through both the hub 18 and the rotor blade 20 for repair and/or maintenance procedures.

Still referring to FIG. 3, one of the stiffening webs 35 may include an aperture 39 through which the rotor shaft of a rotor blade pitch drive (both not shown) may extend for rotating the rotor blade 20. Accordingly, the pitch drive can be mounted to that specific stiffening web 35.

Figure 5:
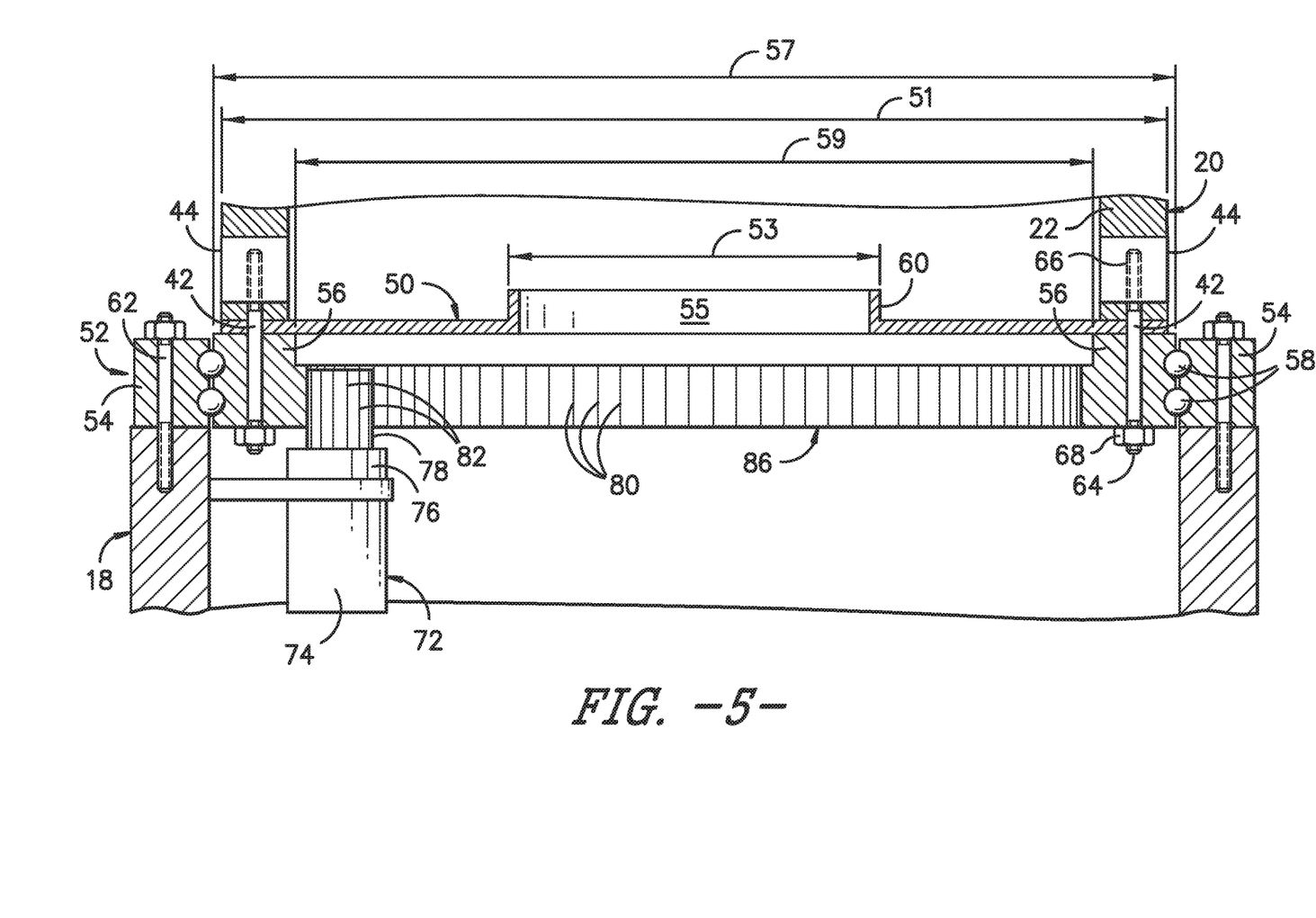
FIG. 5 illustrates a cross-sectional view of one embodiment of one of the rotor blades secured to the hub with one of the stiffener rings according to the present disclosure arranged therebetween.

Referring now to FIGS. 4 and 5, various views of the hub 18 and one of the rotor blades 20 having a stiffener ring 50 arranged therewith are illustrated in accordance with aspects of the present disclosure. As shown particularly in FIG. 4, the rotor blade 20 may be coupled to the hub 18 via a pitch bearing 52. Further, as shown, the pitch bearing 52 includes an outer bearing race 54, an inner bearing race 56, and a plurality of roller elements (e.g., ball bearings 58) disposed between the outer and inner races 54, 56.

In one embodiment, the outer race 54 is generally configured to be mounted to the hub 18 using a plurality of hub bolts 62 and/or other suitable fastening mechanisms. Similarly, the inner race 56 is generally configured to be mounted to the blade root 22 of the rotor blade 20 using a plurality of root bolts 42. For example, as particularly shown in FIG. 5, the root bolt(s) 42 extend between a first end 64 and a second end 66. The first end 64 of each root bolt 42 may be configured to be coupled to a portion of the inner race 56, such as by coupling the first end 64 to the inner bearing race 56 using an attachment nut 68 and/or other suitable fastening mechanism. The second end 66 of each root bolt 42 may be configured to be coupled to the blade root 22 via a barrel nut 44.

Figure 6:
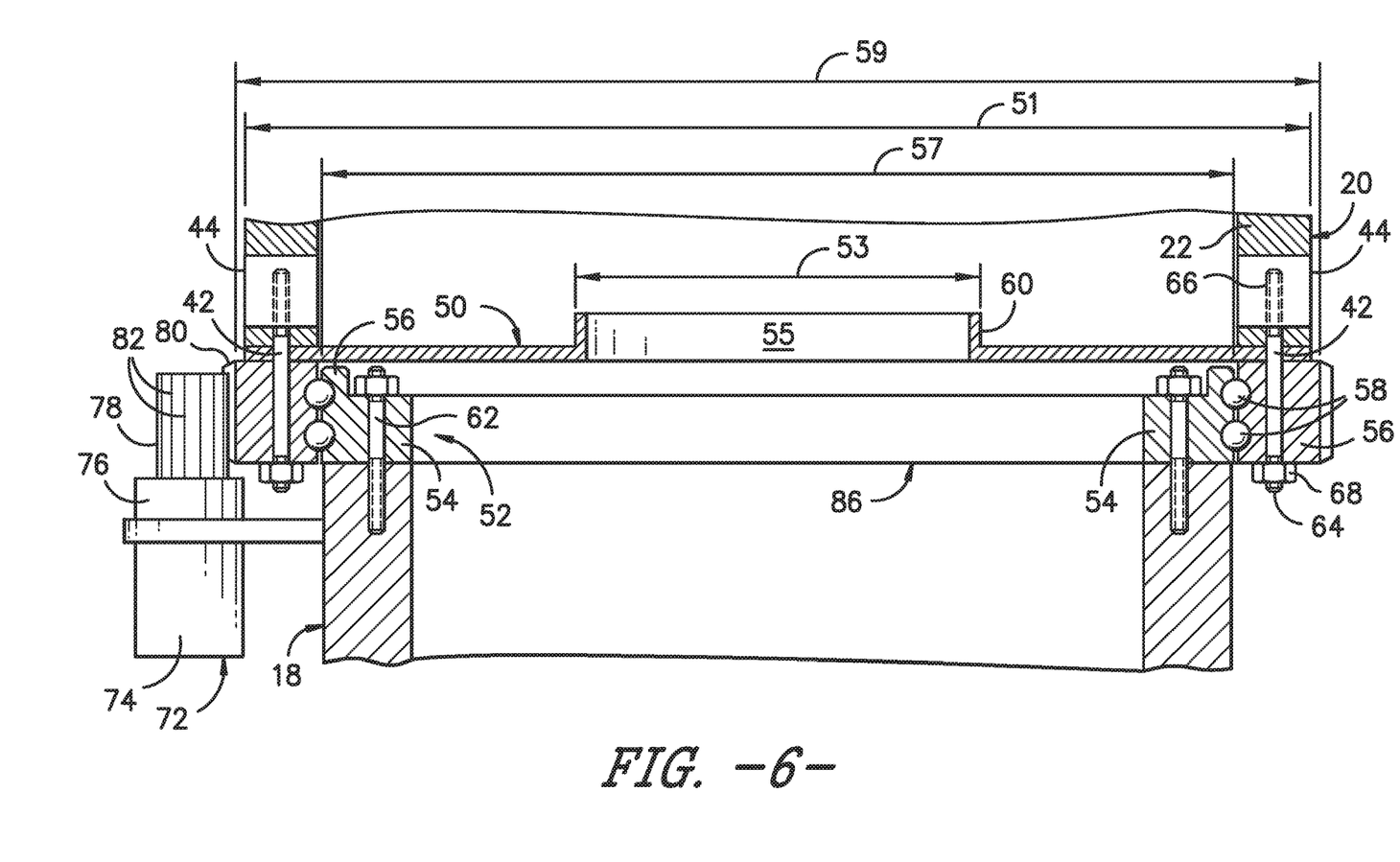
FIG. 6 illustrates a cross-sectional view of another embodiment of one of the rotor blades secured to the hub with one of the stiffener rings according to the present disclosure arranged therebetween.

As is generally understood, the inner race 56 may be configured to be rotated relative to the outer race 54 (via the roller elements 58) to allow the pitch angle of each rotor blade 20 to be adjusted. As shown in FIGS. 5 and 6, such relative rotation of the outer and inner races 54, 56 may be achieved using a pitch adjustment mechanism 72 mounted within a portion of the hub 18.

In general, the pitch adjustment mechanism 72 may include any suitable components and may have any suitable configuration that allows the mechanism 72 to function as described herein. For example, as shown in the illustrated embodiment, the pitch adjustment mechanism 72 may include a pitch drive motor 74 (e.g., an electric motor), a pitch drive gearbox 76, and a pitch drive pinion 78. In such an embodiment, the pitch drive motor 74 may be coupled to the pitch drive gearbox 76 so that the motor 74 imparts mechanical force to the gearbox 76. Similarly, the gearbox 76 may be coupled to the pitch drive pinion 78 for rotation therewith. The pinion 78 may, in turn, be in rotational engagement with the inner race 56.

For example, as shown in FIGS. 5 and 6, a plurality of gear teeth 80 may be formed along an inner circumference 86 of the inner race 56 (or an outer surface of the outer race 54, with the gear teeth 80 being configured to mesh with corresponding gear teeth 82 formed on the pinion 78. Thus, due to meshing of the gear teeth 80, 82, rotation of the pitch drive pinion 78 results in rotation of the inner race 56 relative to the outer race 54 or vice versa and, thus, rotation of the rotor blade 20 relative to the hub 18.

Figure 7:
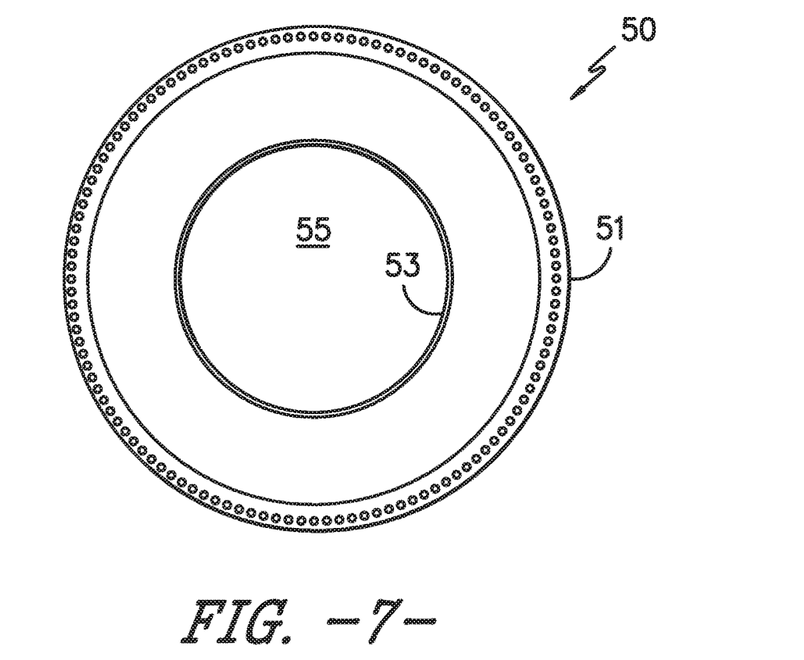
FIG. 7 illustrates a front view of one embodiment of the stiffener ring according to the present disclosure.
Figure 8:
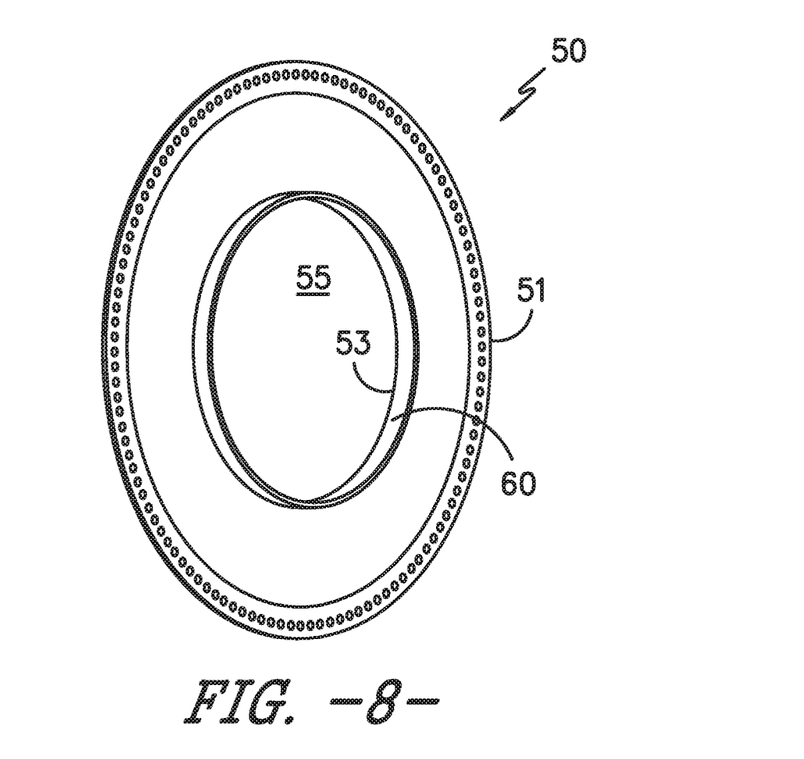
FIG. 8 illustrates a perspective view of one embodiment of the stiffener ring according to the present disclosure.
Figure 9:
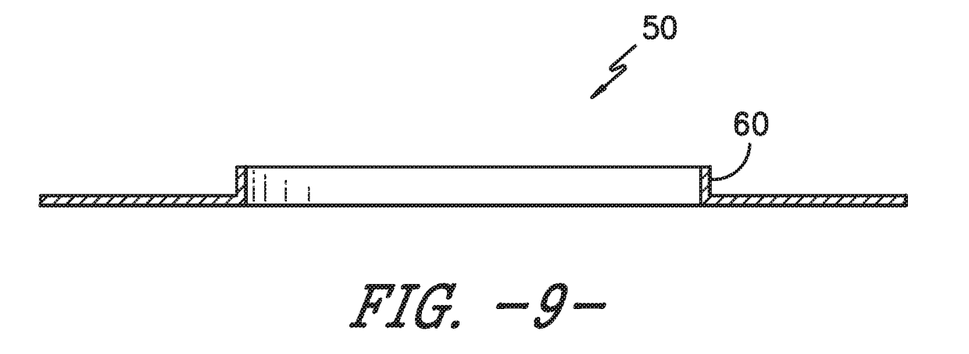
FIG. 9 illustrates a side view of one embodiment of the stiffener ring according to the present disclosure.

Referring now to FIGS. 4-9, various detailed views of the stiffener ring 50 according to the present disclosure are illustrated. Further, as shown, the stiffener ring 50 has a symmetrical shape so as to provide uniform stiffness to the pitch bearing 52. For instance, FIG. 4 illustrates a perspective view of one embodiment of the hub 18 with one of the stiffener rings 50 arranged at each of the openings 29 of the hub 18, with the rotor blades 20 removed to illustrate details thereof. FIGS. 5 and 6 illustrate cross-sectional views of multiple embodiments of one of the rotor blades 20 secured to the hub 18 with one of the stiffener rings 50 arranged therebetween. FIG. 7 illustrates a front view of one embodiment of the stiffener ring 50 according to the present disclosure. FIG. 8 illustrates a perspective view of one embodiment of the stiffener ring 50 according to the present disclosure. FIG. 9 illustrates a side view of one embodiment of the stiffener ring 50 according to the present disclosure.

The stiffener ring 50 may be arranged between one of the inner race 56 or the outer race 54 of the pitch bearing 52 and the blade root 22. For example, as shown in FIG. 5, the stiffener ring 50 is arranged between the inner race 56 of the pitch bearing 52 and the blade root 22. More specifically, in one embodiment, the stiffener ring 50 may be coupled between the inner race 56 and the blade root 22 via the plurality of root bolts 42 (as shown) or a press fit. In another embodiment, as shown, the inner race 56 may be coupled to the blade root 22 of the rotor blade 20 and the outer race 54 may be coupled to the hub 18.

Alternatively, as shown in FIG. 6, the stiffener ring 50 is arranged between the outer race 54 of the pitch bearing 52 and the blade root 22. More specifically, in an embodiment, the stiffener ring 50 may be coupled between the outer race 54 and the blade root 22 via the plurality of root bolts 42 (as shown) or a press fit.

In addition, as shown particularly in FIGS. 4 and 5, the stiffener ring 50 may extend radially inward of the inner race 56 of the pitch bearing 52. Further, as shown in FIGS. 5-8, the stiffener ring 50 may define an outer diameter 51 and an inner diameter 53. In such embodiments, as shown particularly in FIG. 5, the outer diameter 51 may be equal to or less than an outer diameter 57 of the inner race 56, whereas the inner diameter 53 may be less than an inner diameter 59 of the inner race 56. In another embodiment, as shown, the inner diameter 53 of the stiffener ring 50 may define a central opening 55. Thus, the central opening 55 allows personnel to easily pass through the stiffener ring 50, while also maintain enough stiffness to the pitch bearing 52 to prevent excessive or unallowable deformation or stress concentration during operation of the wind turbine 10.

Referring particularly to FIGS. 5 and 8-9, the stiffener ring 50 may further include a first circumferential flange 60 positioned at and circumferentially surrounding the central opening 55. Thus, the first circumferential flange 60 is configured to provide additional uniform stiffness to the stiffener ring 50. In several embodiments, as shown in FIG. 5, the first circumferential flange 60 may extend toward the blade tip 24 of the rotor blade 20.

Figure 10:
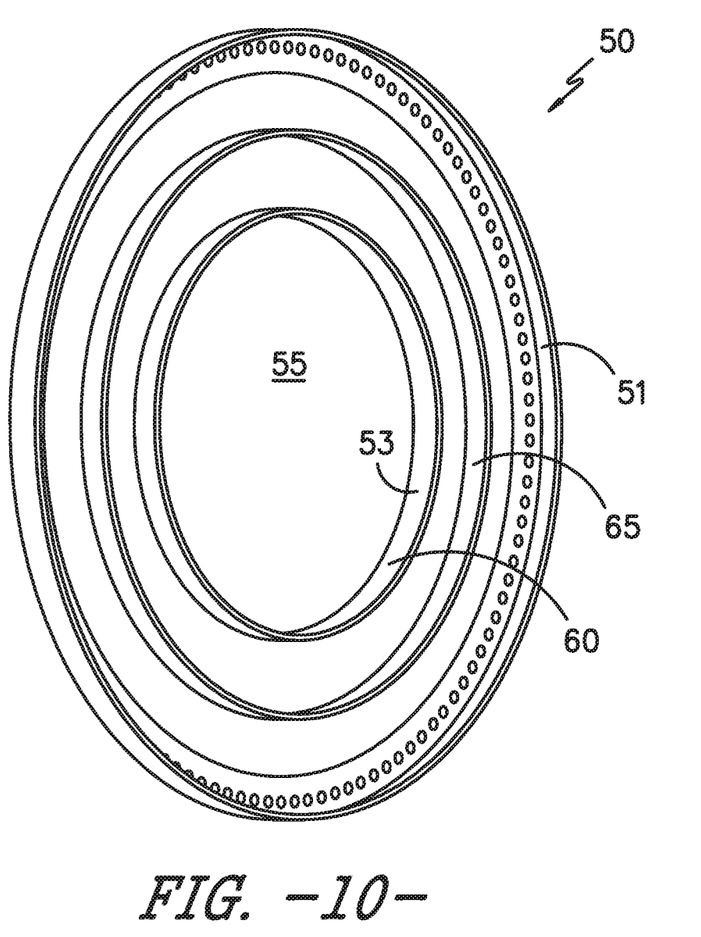
FIG. 10 illustrates a front view of another embodiment of the stiffener ring according to the present disclosure.

Referring now to FIG. 10, a front view of another embodiment of the stiffener ring 50 according to the present disclosure is illustrated. As shown, the stiffener ring 50 may include any combination of features described herein. In addition, as shown, the stiffener ring 50 may also include at least one stiffening rib 65 at a radial position between the outer and inner diameters 51, 53 of the stiffener ring 50. In other words, it should be understood that any number of ribs and/or flanges may be provided on the stiffener ring 50 to provide the desired uniform stiffness thereto. Further, the various ribs and/or flanges may be concentric with each other. Moreover, the ribs and/or flanges may have any suitable shape, such as an L-shape, a T-shape, or an O-shape.

Figure 11:
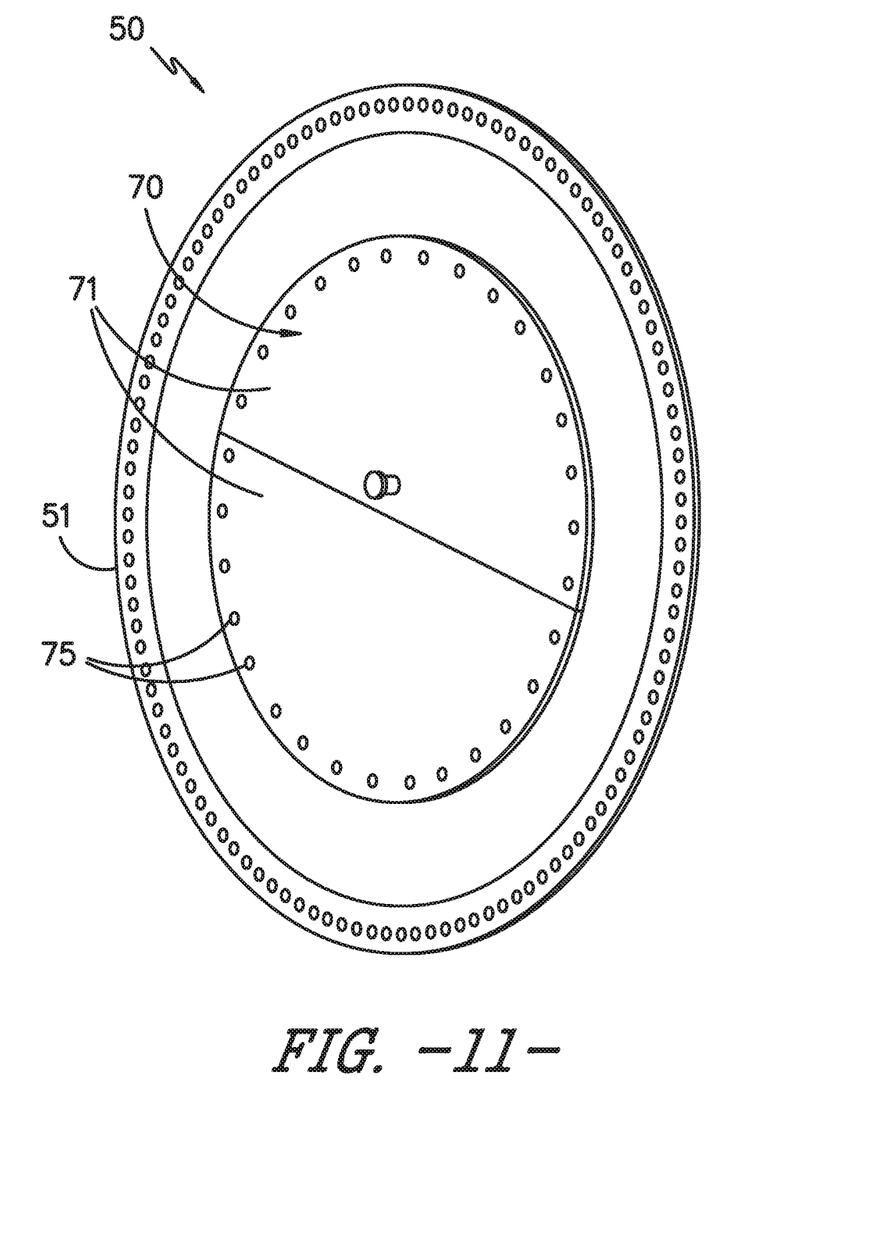
FIG. 11 illustrates a perspective view of another embodiment of the stiffener ring according to the present disclosure, particularly illustrating a cover arranged with a central opening of the stiffener ring.

Referring now to FIG. 11, in certain embodiments, the stiffener ring 50 may also include a removable cover 70 covering the central opening 55 so as to form a bulkhead for personnel to use, e.g. during repairs and/or maintenance procedures. For example, as shown, the cover 70 may be arranged on an interior side of the stiffener ring 50 such that the cover 70 can be accessed from the inside of the hub 18. Thus, in an embodiment, the cover 70 may be formed of any suitable material, such as steel, aluminum, or fiber-reinforced plastic. The removable cover 70 may be a unitary cover or may be constructed of a plurality of segments 71. For example, as shown in FIG. 10, the removable cover 70 may be constructed of a plurality of segments 71. Thus, in such embodiments, the removable cover 70 may be hinged to form a door that personnel can easily enter and exit.

In addition, as shown, the stiffener ring 50 may have a plurality of holes (e.g. beneath the cover 70 and therefore not shown) configured to accommodate a plurality of fasteners 75 (e.g. rivet nuts, bolts, pins, etc.) that secure the cover 70 to the ring 50. Accordingly, the cover 70 can be designed to transfer loads during operation of the wind turbine 10. With such load carrying capability, the stiffener ring 50 may be reduced in thickness or may have less stiffening ribs/flanges as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor assembly for a wind turbine, the rotor assembly comprising: a rotor blade extending between a blade root and a blade tip; a rotatable hub; a pitch bearing arranged between the rotor blade and the rotatable hub, the pitch bearing comprising an outer race, an inner race rotatable relative to the outer race, and a plurality of roller elements arranged between the outer race and the inner race; and, a stiffener ring arranged between one of the inner race or the outer race of the pitch bearing and the blade root, the stiffener ring comprising a symmetrical shape so as to provide a uniform stiffness to the pitch bearing, the stiffener ring further comprising an outer diameter and an inner diameter and at least one stiffening rib at a radial position between the outer and inner diameters, the outer diameter being equal to or less than an outer diameter of the inner race, the inner diameter being less than an inner diameter of the inner race of the pitch bearing, the inner diameter defining a central opening so as to allow ingress and egress through the stiffener ring, the central opening covered by a removable cover so as to form a bulkhead, the stiffener ring further comprising a first circumferential flange positioned at and circumferentially surrounding the central opening, wherein the first circumferential flange extends in a longitudinal direction of the rotor blade.

2. The rotor assembly of claim 1, wherein the inner race is coupled to at least one of the blade root of the rotor blade or the rotatable hub and the outer race is coupled to the other of the blade root of the rotor blade or the rotatable hub.

3. The rotor assembly of claim 2, wherein the stiffener ring is coupled between the inner race of the pitch bearing and the blade root of the rotor blade.

4. The rotor assembly of claim 1, wherein the stiffener ring is coupled between the inner race of the pitch bearing and the blade root of the rotor blade via a plurality of root bolts or a press fit.

5. The rotor assembly of claim 1, wherein the stiffener ring extends radially inward of the inner race of the pitch bearing.

6. The rotor assembly of claim 1, wherein the first circumferential flange extends toward the blade tip of the rotor blade.

7. The rotor assembly of claim 1, wherein the stiffener ring further comprises a second circumferential flange positioned at and circumferentially surrounding the outer diameter of the stiffener ring.

8. The rotor assembly of claim 1, wherein the removable cover is constructed of a plurality of segments.

9. A wind turbine, comprising: a tower; a nacelle mounted atop the tower; a rotor mounted to the nacelle, the rotor comprising a rotatable hub having a plurality of rotor blades secured thereto, each of the rotor blades extending between a blade root and a blade tip; a pitch bearing arranged between each of the plurality of rotor blades and the rotatable hub, each of the pitch bearings comprising an outer race, an inner race rotatable relative to the outer race, and a plurality of roller elements arranged between the outer race and the inner race; and, a stiffener ring arranged between each of the pitch bearings and each of the blade roots of the rotor blades, each of the stiffener rings comprising a symmetrical shape so as to provide a uniform stiffness to the pitch bearing, each of the stiffener rings further comprising an outer diameter and an inner diameter and at least one stiffening rib at a radial position between the outer and inner diameters, the outer diameter being equal to or less than an outer diameter of the inner race, the inner diameter being less than an inner diameter of the inner race of the pitch bearing, the inner diameter defining a central opening so as to allow ingress and egress through the stiffener ring, the central opening covered by a removable cover so as to form a bulkhead, each of the stiffener rings further comprising at least one circumferential flange positioned at and circumferentially surrounding the central opening, wherein the at least one circumferential flange extends in a longitudinal direction of the rotor blade.

10. The wind turbine of claim 9, wherein each of the stiffener rings are coupled between at least one of the inner race or the outer race of the pitch bearing and the blade root of the rotor blade via a plurality of root bolts or a press fit.

11. The wind turbine of claim 10, wherein each of the stiffener rings extends radially inward of the inner races of the pitch bearings.

12. The wind turbine of claim 9, wherein the at least one circumferential flange extends toward the blade tip of the rotor blade.

13. The wind turbine of claim 9, wherein the hub further comprises a plurality of openings, each of the plurality of openings configured to receive one of the pitch bearings, each of the plurality of openings further comprises a stiffening web integrally formed with a wall of the hub and extending radially inward to a center of the opening.

14. The wind turbine of claim 13, wherein portions of each of the plurality of openings remains open, and wherein the portions of each of the plurality of openings that remains open are at least partially aligned with the central openings of the stiffener rings.

\* \* \* \* \*